(12) United States Patent
Hensel (10) Patent No.: US 7,000,563 B2
(45) Date of Patent: *Feb. 21, 2006

(54) TAILGATE POSITION INDICATOR

(76) Inventor: Raymond L. Hensel, 5168 Foxchase, NW., Canton, OH (US) 44718

( * ) Notice: Subject to any disclaimer, the term of this patent is extended or adjusted under 35 U.S.C. 154(b) by 0 days.

This patent is subject to a terminal disclaimer.

(21) Appl. No.: 10/439,430

(22) Filed: May 16, 2003

(65) Prior Publication Data

US 2003/0196583 A1 Oct. 23, 2003

Related U.S. Application Data

(63) Continuation-in-part of application No. 09/550,402, filed on Apr. 14, 2000, now abandoned, which is a continuation-in-part of application No. 09/014,233, filed on Jan. 27, 1998, now Pat. No. 6,065,423.

(51) Int. Cl.
*B60Q 1/30* (2006.01)
*B60R 1/06* (2006.01)

(52) U.S. Cl. ............... 116/35 R; 116/209; 280/762

(58) Field of Classification Search ............... 33/264; 180/271; 296/56, 57.1; 280/477, 479.2, 280/479.3, 727, 761, 762; 116/200, 202, 116/30, 209, 307, DIG. 5, 28 R, 35 R See application file for complete search history.

(56) References Cited

U.S. PATENT DOCUMENTS

| | | | | |
|---|---|---|---|---|
| 1,718,674 A | * | 6/1929 | Wheeler | 40/459 |
| 2,984,011 A | * | 5/1961 | Hamilton | 33/264 |
| 3,563,200 A | * | 2/1971 | Grossman | 116/28 R |
| 3,762,360 A | * | 10/1973 | Hawes | 116/28 R |
| 3,788,268 A | * | 1/1974 | Hiatt et al. | 116/28 R |
| 3,901,536 A | * | 8/1975 | Black | 280/477 |
| 3,924,558 A | * | 12/1975 | Di Grazia | 116/28 R |
| 4,028,829 A | * | 6/1977 | Murray | 40/485 |
| 4,192,526 A | * | 3/1980 | Myers | 280/477 |
| 4,257,706 A | * | 3/1981 | Smith | 356/3 |
| 4,325,318 A | * | 4/1982 | Kitrell | 116/28 R |
| 4,811,173 A | * | 3/1989 | Johnson | 362/540 |
| 5,094,001 A | * | 3/1992 | Fraser | 33/264 |
| 5,113,588 A | * | 5/1992 | Walston | 33/264 |
| 5,180,182 A | * | 1/1993 | Haworth | 280/477 |
| 5,305,704 A | * | 4/1994 | Olaniyan | 362/540 |
| 5,482,310 A | * | 1/1996 | Staggs | 280/477 |
| 5,678,505 A | * | 10/1997 | Leung et al. | 116/28 R |
| 6,010,107 A | * | 1/2000 | Goldfarb | 248/512 |
| 6,065,423 A | * | 5/2000 | Hensel | 116/35 R |
| 6,345,587 B1 | * | 2/2002 | Toscano | 116/30 |
| 6,374,766 B1 | * | 4/2002 | Clark | 116/28 R |
| 6,834,878 B1 | * | 12/2004 | Koestler | 280/477 |
| 6,880,849 B1 | * | 4/2005 | Teague | 280/477 |

* cited by examiner

*Primary Examiner*—R. Alexander Smith
(74) *Attorney, Agent, or Firm*—Zollinger & Burleson Ltd (57) ABSTRACT

An indicator device for alerting the driver of a pickup truck to the orientation of the tailgate includes a housing assembly and an indicator assembly carried by and extending from the housing assembly. The housing assembly is attached to the tailgate of the pickup truck in a position that causes at least a portion of the indicator assembly to extend from the side of the truck so that the driver can see the extending portion in the side view mirror of the truck. Viewing the position of the indicator assembly allows the driver of the truck to ascertain the position of the tailgate.

11 Claims, 13 Drawing Sheets

TAILGATE POSITION INDICATOR

CROSS-REFERENCE TO RELATED APPLICATIONS

This application is a continuation-in-part application of U.S. patent application Ser. No. 09/550,402 filed Apr. 14, 2000 now abandoned, which is a continuation-in-part application of application Ser. No. 09/014,233, filed Jan. 27, 1998, now U.S. Pat. No. 6,065,423 issued May 23, 2000; the disclosures of which are incorporated herein by reference.

BACKGROUND OF THE INVENTION

1. Technical Field

The invention relates generally to an indicating device. More particularly, the invention relates to a device for indicating the position of a truck tailgate to a person sitting in the cab of the truck. Specifically, the invention relates to an indicating device connected directly to a truck tailgate which has an adjustable indicating rod that extends outwardly from a housing a distance sufficient that it may be seen from a person sitting in the cab of the truck, the position of the rod indicating the position of the tailgate.

2. Background Information

A pickup truck is a vehicle upon the chassis of which is constructed a flat bed to which are connected low walls circumferentially constructed about the bed. The truck bed is designed to haul large solid objects and loose objects such as sand and gravel. To facilitate the loading and unloading of large solid objects and to facilitate the unloading of loose materials, the rearward wall of the bed is hingedly attached to the lower surface of the truck bed whereby when released, the rearward wall or tailgate moves angularly outward about the bed from a vertical position to a horizontal position creating a shelf extending outward from the rear of the truck.

Trucks contain mirrors and other devices that allow an occupant in the truck to adequately view the roadway to the rear of the vehicle. Such mirrors do not, however, provide an adequate view of the tailgate when the vehicle is in a loaded condition or when the truck bed is covered by a tarp or tonneau cover. In such situations, the tailgate is obstructed from the driver's view.

Use of a truck on a roadway with the tailgate in a horizontal position creates a hazardous situation which should be avoided. The bumping and jarring of the vehicle on the roadway may cause the contents of the truck bed to become dislodged and either fall onto the roadway creating a hazardous situation to other drivers or may fall directly onto a closely following vehicle. Even with the truck bed in an unloaded state, the tailgate in a horizontal position is of a very low profile, making the horizontal tailgate difficult to discern by motorists to the rear of the truck, creating the potential for collision with the rearward-most edge of the tailgate.

Thus, the operator of the pickup truck must constantly be aware of the position of the tailgate. In situations in which the view of the tailgate is obstructed from the driver, the driver must stop the truck and exit the vehicle to directly observe from the rear the position of the tailgate. This results in significant wasted time and reduced efficiency for both the truck and its operator.

The need thus exists in the art for a low cost mechanism which allows the truck operator to quickly ascertain the position of the vehicle tailgate from the cab of the truck to minimizing risks to others and maximizing the efficiency of the operator and of the truck itself.

BRIEF SUMMARY OF THE INVENTION

Objectives of the invention include providing a device for quickly indicating to the driver of a truck the position of the tailgate without the need for the driver to stop the truck, dismount, and view the tailgate directly.

Another objective is to provide a device which may be used to alert the vehicle driver to the potentially dangerous condition in which the tailgate is in the horizontal position.

Still another objective is to provide a device which may be used to alert the driver of the truck to a condition in which the truck's cargo may potentially be lost due to the failure of the tailgate to be in the vertical position where it otherwise would serve to retain the load contained therein.

Yet another objective is to provide an indicator device which is substantially weather resistant.

Another objective is to provide an indicator device which is mountable to a wide variety of tailgates and is non-damaging to the surfaces to which it is mounted.

A further objective is to provide an indicator device which will be non-damaging to other objects which may strike it or otherwise come into contact with it.

Still a further objective is to provide an indicator device which can be adjusted by hand and without the use of additional tools.

Yet a further objective is to provide an indicator device which is of simple construction and is inexpensive to manufacture.

These and other objectives and advantages of the invention are obtained from the device for indicating truck tailgate position, the general nature of which can be stated as including a housing assembly; an indicator assembly carried by and extending from the housing assembly; and attachment means for attaching the housing assembly to the tailgate of a pickup truck.

The invention also provides a customizable indicator rod having a plurality of indicator bodies. The rod is designed to be shortened by the user after the rod is connected to the tailgate so that only one or two indicator bodies are visible from the cab. This feature allows the indicator to be used with a wide variety of trucks.

BRIEF DESCRIPTION OF THE SEVERAL VIEWS OF THE DRAWINGS

The preferred embodiments of the invention, illustrative of the best modes in which applicant has contemplated applying the principles, are set forth in the following description and are shown in the drawings and are particularly and distinctly pointed out and set forth in the appended claims.

Similar numerals refer to similar parts throughout the drawings.

DETAILED DESCRIPTION OF THE INVENTION

Figure 1:
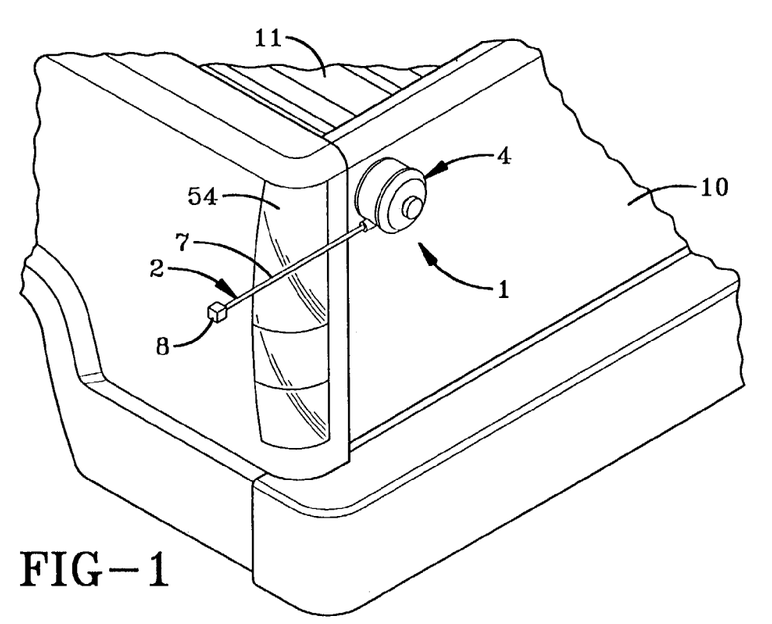
FIG. 1 is a perspective view of the tailgate position indicator of the present invention attached to a tailgate with the tailgate in a closed, vertical position.
Figure 1A:
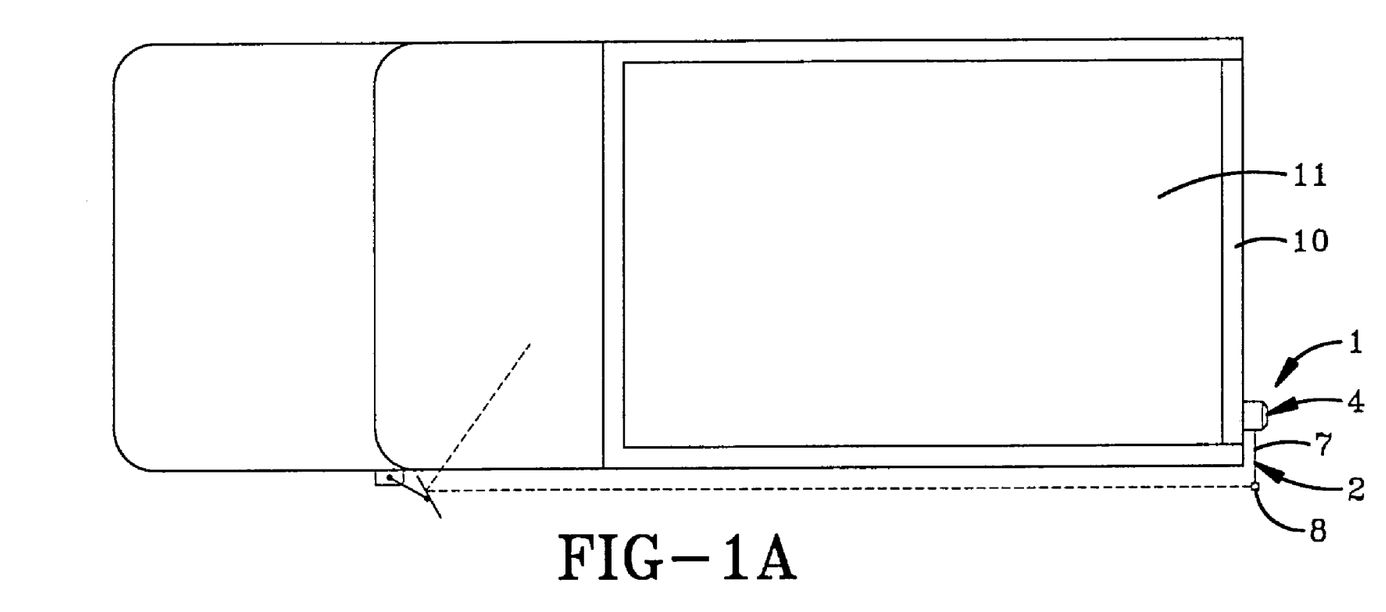
FIG. 1A is a plan view of a pickup truck with the tailgate position indicator device of the present invention installed thereon and showing site lines depicting how the indicator is observable in a mirror from the cab of the truck.
Figure 2:
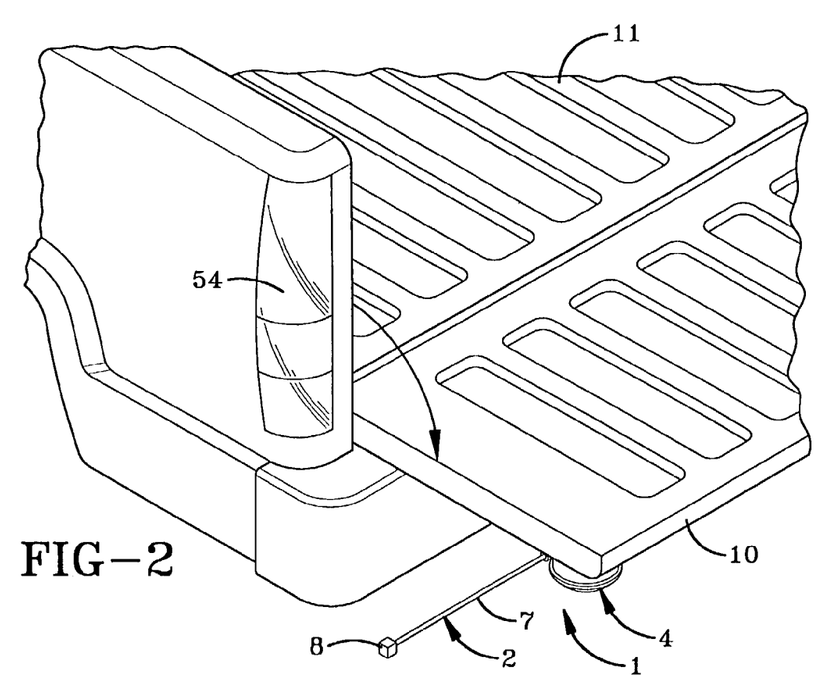
FIG. 2 is a perspective view of the tailgate position indicator of the present invention with the pickup truck tailgate in the open or horizontal position.
Figure 3:
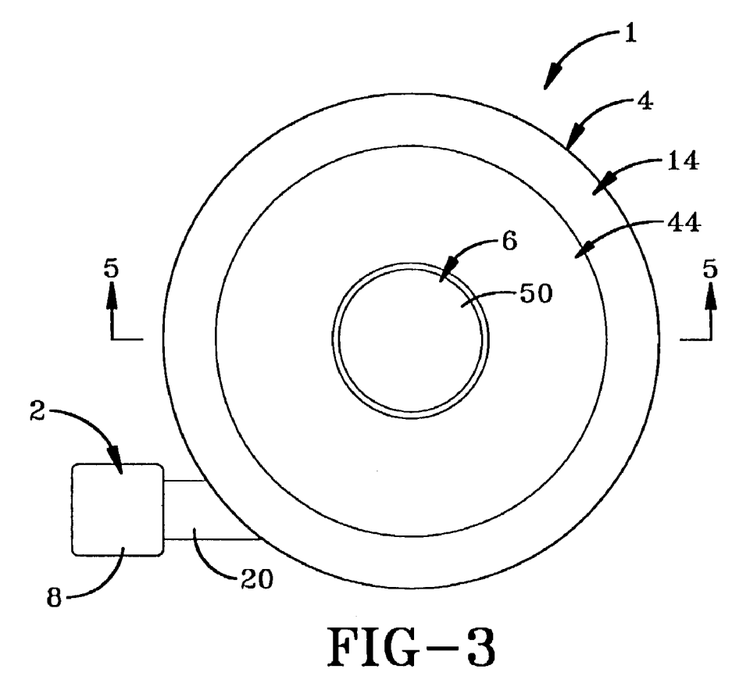
FIG. 3 is a plan view of the first embodiment of the tailgate position indicator of the present invention with the indicator rod in a retracted position.
Figure 4:
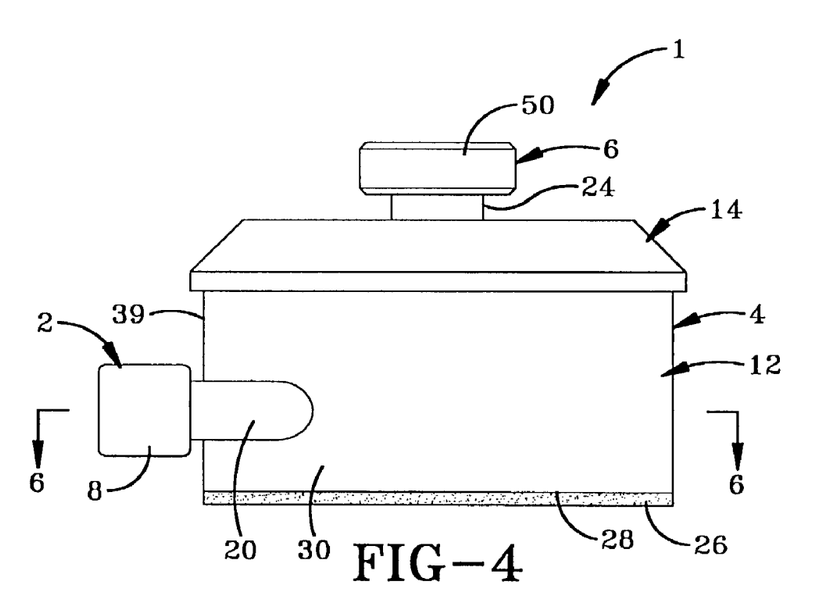
FIG. 4 is an elevation of the indicator of FIG. 3.
Figure 5:
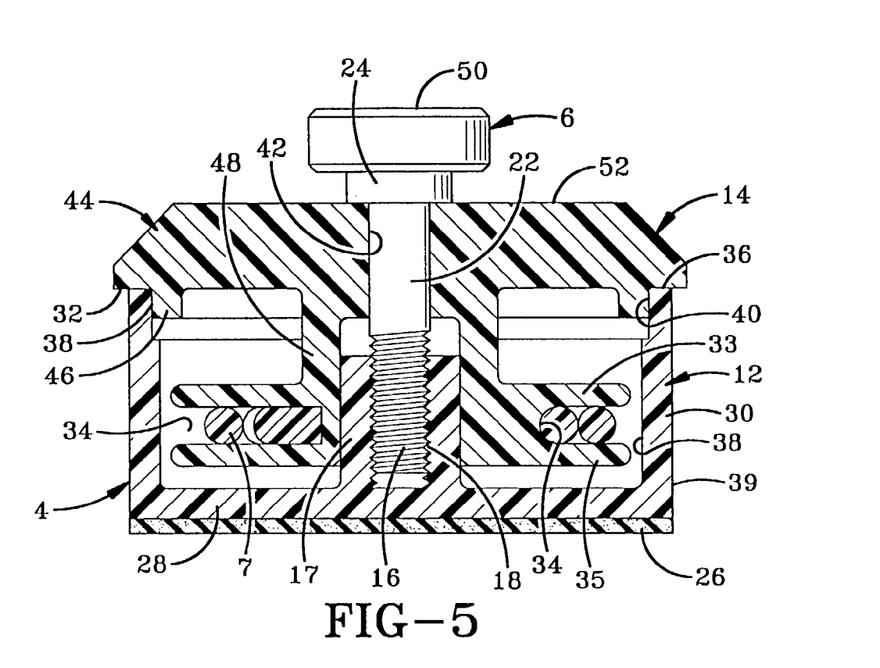
FIG. 5 is a sectional view taken along line 5—5 of FIG. 3.

The improved tailgate position indicator of the present invention is indicated generally by the numeral 1 in the accompanying drawings. Tailgate position indicator 1 includes an indicator assembly 2 and a housing assembly 4. FIGS. 1 and 2 depict the invention in its typical environment where it is attached to the upper end of a truck tailgate 10 at a location distal from the tailgate's hinged attachment to the truck bed 11. Indicator 1 generally includes a housing assembly 4 from which extends an indicator assembly 2. Housing assembly 4 is adapted to allow the length of indicator assembly 2 extending from housing assembly 4 to be viewed by a person in the cab of the truck so that the person can determine the position of tailgate 10.

Indicator assembly 2 includes an indicator rod 7 and an indicator body 8 attached to a first end of indicator rod 7. Indicator rod 7 may be manufactured of a strong, resilient material of a nominally circular cross section, in which the diameter is significantly smaller than its length. In one embodiment of the present invention, indicator rod 7 is in the form of a tightly wound spring of steel, although alternative materials may be used without departing from the spirit of the present invention. One such alternative material is a light-transmitting material that is described in more detail below. While tailgate position indicator 1 typically includes indicator body 8, indicator 1 may be used without indicator body 8 without impairing its functionality.

Housing assembly 4 includes a screw 6, a container 12, and a spool 14. Spool 14 is adapted to selectively rotate within container 12 to wrap indicator rod 7 about itself to vary the length of rod 7 extending from housing assembly 4. Screw 6 may be used to lock the position of spool 14 with respect to container 12 to thus lock the position of indicator rod 7.

Container 12 includes a substantially cylindrical side wall 30 having an inner surface 38 and an outer surface 39. Container 12 further includes at one end a substantially circular lower wall 28 attached circumferentially to side wall 30. At the other end, side wall 30 terminates in an toroidal face 32. Side wall 30 and lower wall 28 define a cavity in container 12. An adhesive layer 26 is disposed on lower wall 28 on a side opposite the circumferential attachment of lower wall 28 with side wall 30. A hollow cylindrical hub 17 having internal threads 18 on its inner surface projects upwardly from lower wall 28 in an orientation coaxial with side wall 30 and internally disposed to container 12. Hub 17 may be integrally formed with wall 28 or may be attached by appropriate means.

Container 12 further includes a hollow cylindrical neck 20, extending substantially perpendicular to the center axis of container 12. The centerline of neck 20 is also non-radially disposed with respect to container 12.

Figure 6:
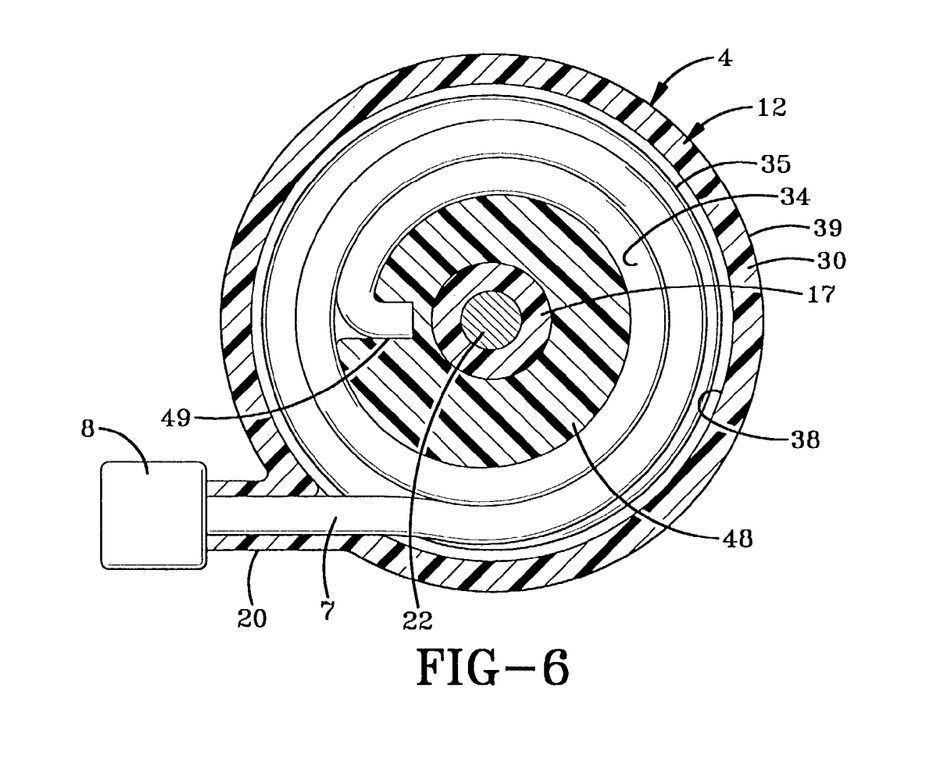
FIG. 6 is a sectional view taken along line 6—6 of FIG. 4.

Spool 14 includes a circular body 44 of approximately the same or slightly larger diameter than the diameter defined by outer surface 39. Circular body 44 is formed with a thru-bore 42 of circular cross section perpendicular to the plane of circular body 44. A lower face of circular body 44 contains an annular ridge 46. The outermost arcuate face of annular ridge 46 defines a guide edge 40 which is of approximately, but slightly less than, the diameter of inner surface 38. Spool 14 further includes a cylindrical wall 48 extending downwardly from body 44. Wall 48 includes two substantially annular flanges 33 and 35 that cooperate with wall 48 to define a storage channel 34. Storage channel 34 is adapted to receive almost the entire length of indicator rod 7 as depicted in FIG. 6. An anchor slot 49 is formed in wall 48 to receive one end of rod 7. Indicator rod 7 may thus be wound into channel 34 when wall 48 is rotated.

Screw 6 includes a shank 22 having external threads 16 formed thereon along a portion of its length which are adapted to cooperate with internal threads 18. Screw 6 further includes a shoulder 24 which is concentric with shank 22 and of a somewhat larger outer diameter than shank 22. Shank 22 is of a circular cross section and of a diameter slightly less than that defined by thru-bore 42. The outer diameter of shoulder 24 is of a diameter larger than that of thru-bore 42. Shoulder 24 contains a flat toroidal bearing surface 52 perpendicular to the longitudinal axis of shank 22. Screw 6 may also include a knurled thumb knob 50 adjacent shoulder 24 and disposed at the end distal to external threads 16.

Figure 7:
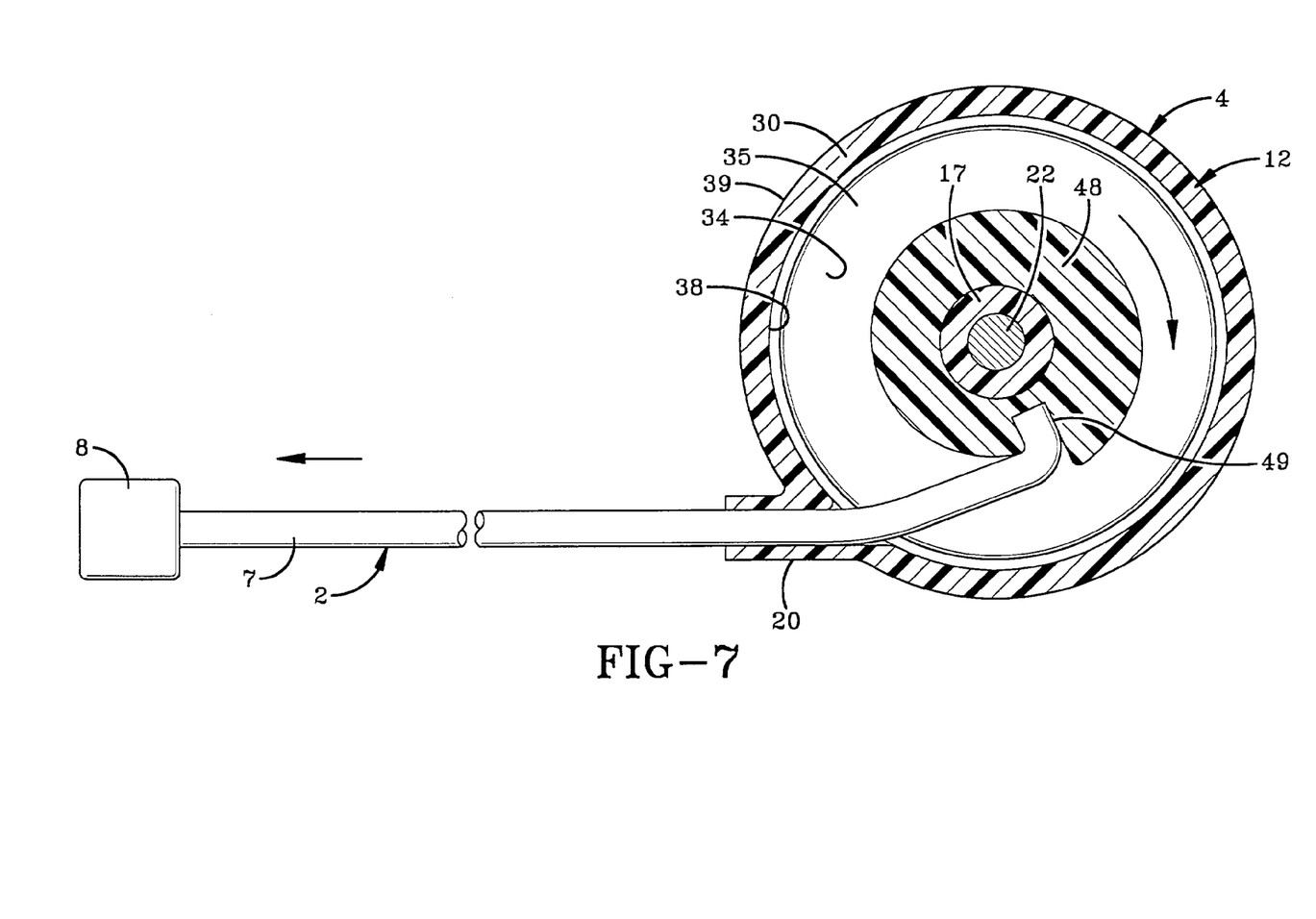
FIG. 7 is a sectional view similar to FIG. 6 showing the indicator rod in a fully extended position.
Figure 8:
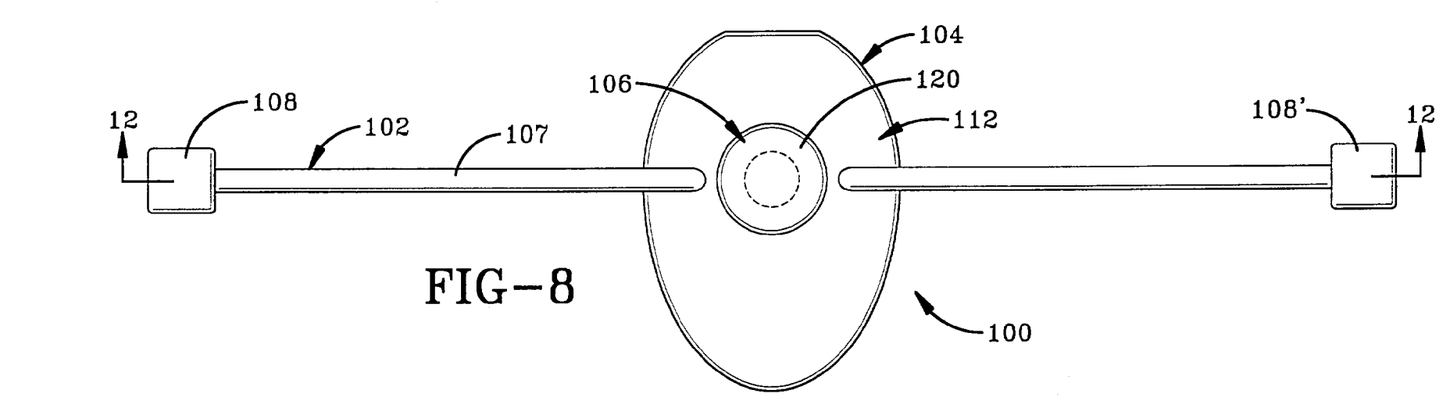
FIG. 8 is a plan view of a second embodiment of the tailgate position indicator of the present invention.
Figure 9:
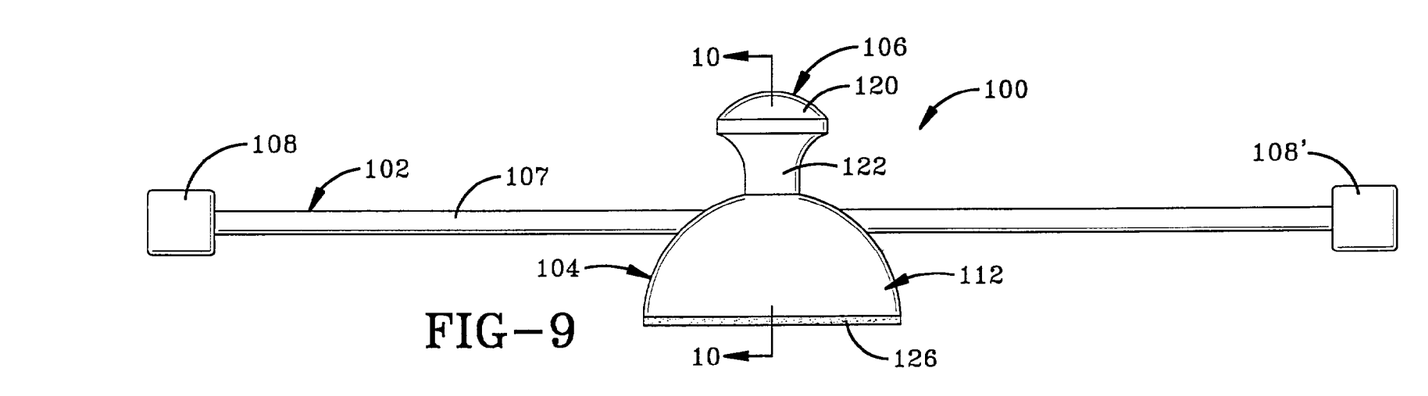
FIG. 9 is an elevation of the indicator of FIG. 8.

When housing assembly 4 is assembled, spool 14 is placed in relation with container 12 such that annular guide edge 40 lies adjacent inner surface 38, and such that storage channel 34 and annular ridge 46 are internal to the cavity formed by container 12. In such an orientation, thru-bore 42 is concentric with internal threads 18. Screw 6 is inserted into thru-bore 42 and external threads 16 are threaded into internal threads 18. When screw 6 is tightened, spool 14 is frictionally held in angular orientation with respect to container 12. Because indicator rod 7 is fixedly attached to wall 48 and disposed in storage channel 34, when screw 6 is tightened, indicator assembly 2 is secured in relation to housing assembly 4. When screw 6 is loosened, spool 14 is free, as shown in FIG. 7, to be rotated about shank 22, and such action causes indicator rod 7 to be rotatably retracted into or extended from container 12, depending upon the direction in which spool 14 is rotated. Indicator body 8 serves as a stop beyond which indicator rod 7 should not be retracted.

Adhesive layer 26 may be used to fixedly attach lower wall 28 to the outer surface of the truck tailgate 10 as is indicated in FIGS. 1 and 2. Spool 14 may be rotated such that indicator rod 7 and indicator body 8 extend past truck tail lamp 54 to a degree that indicator rod 7 and indicator body 8 are visible from the cab of the truck. Screw 6 may be tightened to retain indicator rod 7 and indicator body 8 in the extended position. When in the extended position, a person in the cab of the truck is able to look at the position of rod 7 and quickly and easily determine if tailgate 10 is up or down. When a person does not want to use indicator 1, screw 6 may be loosened to allow spool 14 to be rotated to retract indicator rod 7 into a retracted position. In view of the foregoing, it may be understood that indicator 1 provides a device that allows a person sitting in the cab of a truck to determine the position of his tailgate 10 by viewing the position of the indicator rod 7.

A second alternative embodiment of the improved tailgate position indicator of the present invention is indicated generally by the numeral 100 in FIGS. 8 through 13. As in the first embodiment of the invention, tailgate position indicator 100 includes an indicator assembly 102 and a housing assembly 104. Housing assembly 104 is adapted to receive and hold indicator assembly 102 in an adjustable manner such that the length of indicator assembly 102 that extends from housing assembly 104 may be varied.

Indicator assembly 102 includes an indicator rod 107 which carries at a first end a first indicator body 108 and carries at a second end a second indicator body 108'. Indicator rod 107 is in the form of a tightly wound spring of steel, although alternative materials may be employed. Indicator assembly 102 passes through housing assembly 104 such that indicator bodies 108 and 108' are disposed on either side of housing assembly 104.

Housing assembly 104 includes a block 112, a plunger 106, an adhesive layer 126, and a compression spring 114. Compression spring 114 is disposed within block 112 to constantly urge plunger 106 outwardly away from block 112. Block 112 is formed with a passageway 116 extending through block 112 in a position to intersect with plunger 106. Plunger 106 is received within a hole 118 in block 112 that is substantially perpendicular to passageway 116. Passageway 116 is slightly larger in size than indicator rod 107 such that indicator rod 107 can freely slide in passageway 116. A stop 110 defines the lower surface of hole 118. Hole 118 is of a circular cross section of a diameter slightly larger than that of compression spring 114.

Plunger 106 includes a shank 122 which includes a flat terminal edge 132. Shank 122 is of the same or slightly larger diameter than that of compression spring 114, yet is of a slightly smaller diameter than that of hole 118. Shank 122 is formed with a channel 124 therein, with channel 124 including a lower edge 128 and an upper edge 130. Channel 124 is larger in size than indicator rod 107 such that indicator rod 107 may slide through channel 124. Plunger 106 may also include a thumb button 120 to facilitate depression of plunger 106 against spring 114, however plunger 106 may be operated without a thumb button 120 without departing from the spirit of the present invention.

Figure 10:
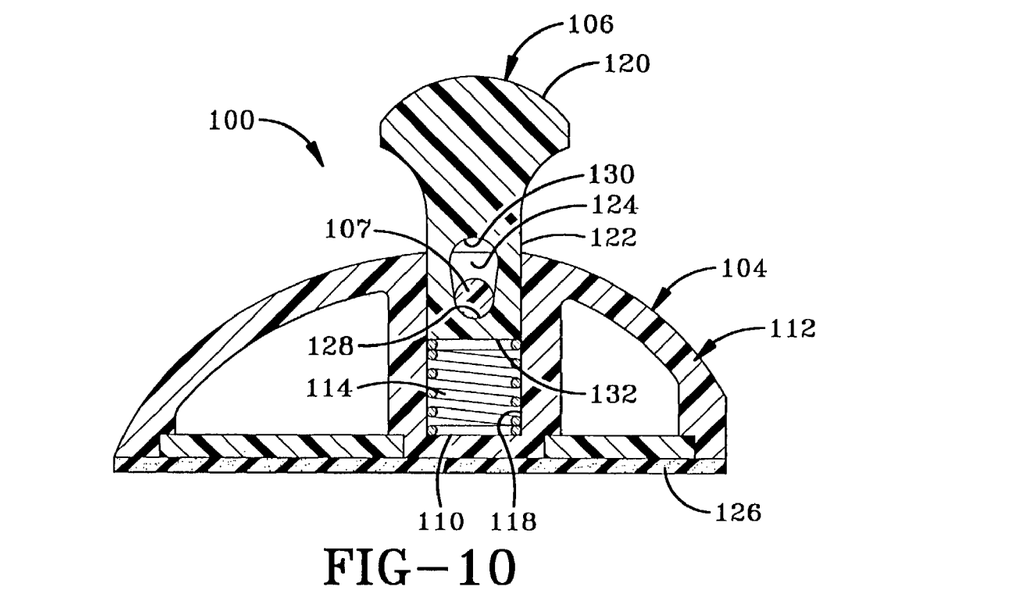
FIG. 10 is a sectional view as taken along line 10—10 of FIG. 9 showing the plunger in a released position.
Figure 11:
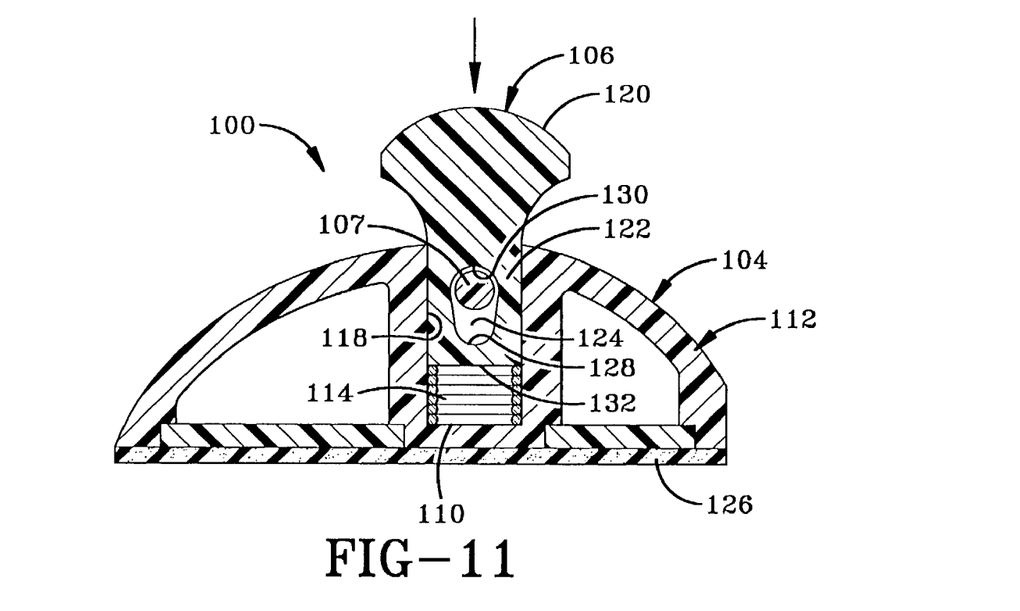
FIG. 11 is a sectional view similar to FIG. 10 showing the plunger in the depressed position.
Figure 12:
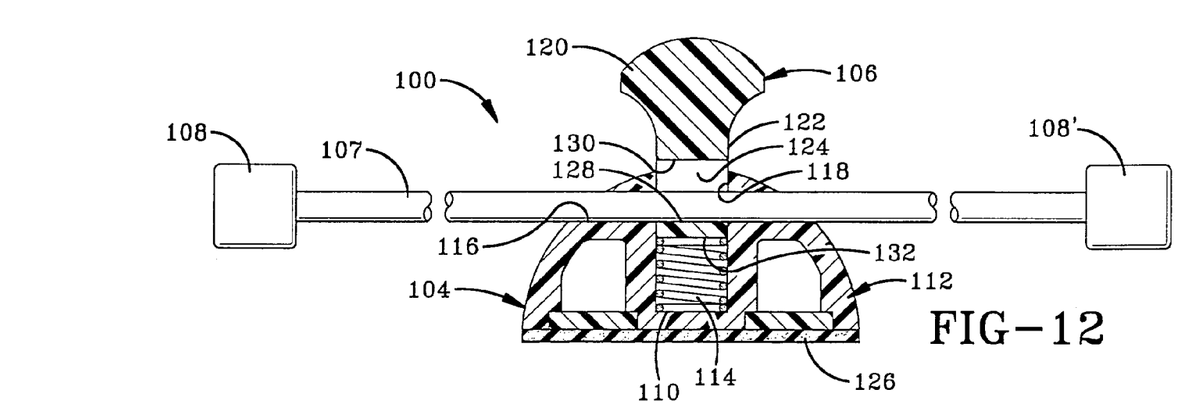
FIG. 12 is a sectional view as taken along line 12—12 in FIG. 8.
Figure 13:
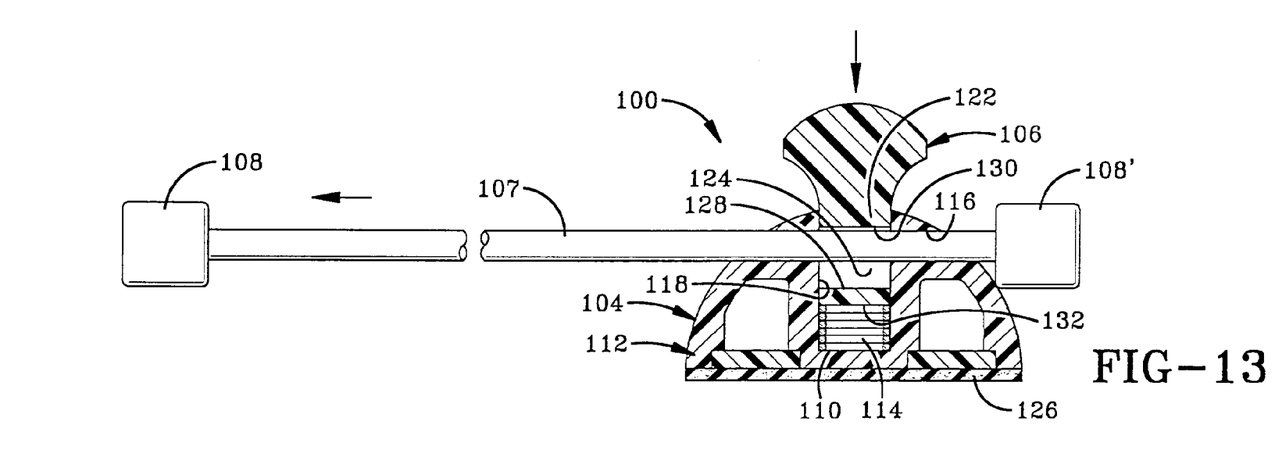
FIG. 13 is a sectional view similar to FIG. 12 and showing the plunger in a depressed position and the indicator rod in an extended position.

When housing assembly 104 is assembled, compression spring 114 rests against stop 110. Plunger 106 extends into hole 118 such that terminal edge 132 rests adjacent compression spring 114. Channel 124 is positioned in shank 122 such that when indicator rod 107 rests inside both passageway 116 and channel 124, compression spring 114 causes a nominal compressive force on terminal edge 132, as is depicted in FIG. 10, causing lower edge 128 to engage indicator rod 107, thus urging indicator rod 107 against channel 116, and thereby frictionally securing indicator rod 107 in relation to block 112. When plunger 106 is depressed with sufficient force to overcome the nominal compressive force imposed by compression spring 114 on terminal edge 132, as depicted in FIG. 11, lower edge 128 is released from contact with indicator rod 107, without upper edge 130 coming into contact with indicator rod 107, and indicator rod 107 can be freely moved in relation to block 112. FIG. 13 demonstrates tailgate position indicator 100 with indicator rod 107 in an extended state. Indicator rod 107 can be moved between extended and retracted states as is shown in FIG. 12, upon depression of plunger 106 and sliding movement of indicator rod 107.

Figure 14:
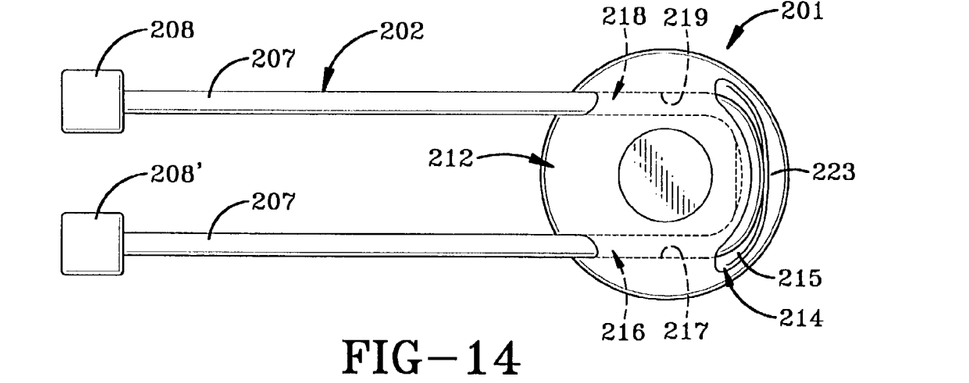
FIG. 14 is a plan view of a third embodiment of the tailgate position indicator of the present invention.
Figure 15:
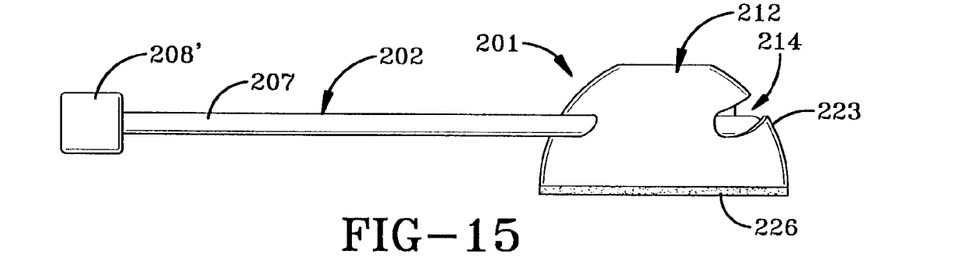
FIG. 15 is an elevation of the indicator of FIG. 14.
Figure 16:
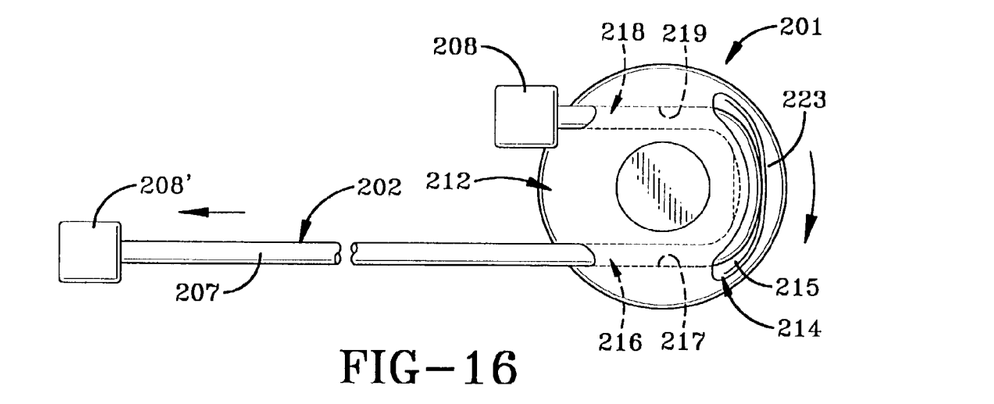
FIG. 16 is a plan view similar to FIG. 14 showing the indicator rod in an extended position.
Figure 17:
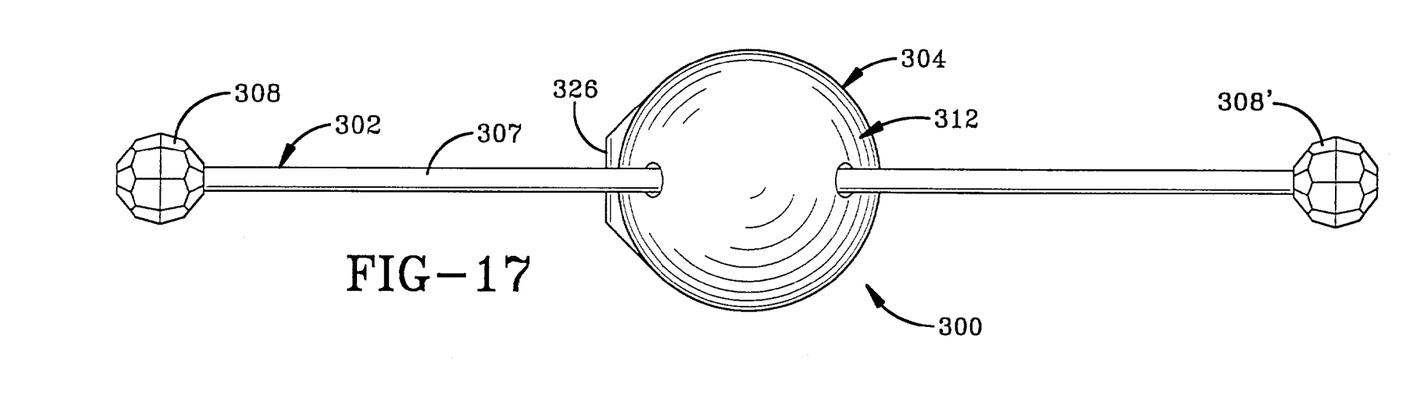
FIG. 17 is a top plan view of a fourth embodiment of the tailgate position indicator of the present invention.
Figure 18:
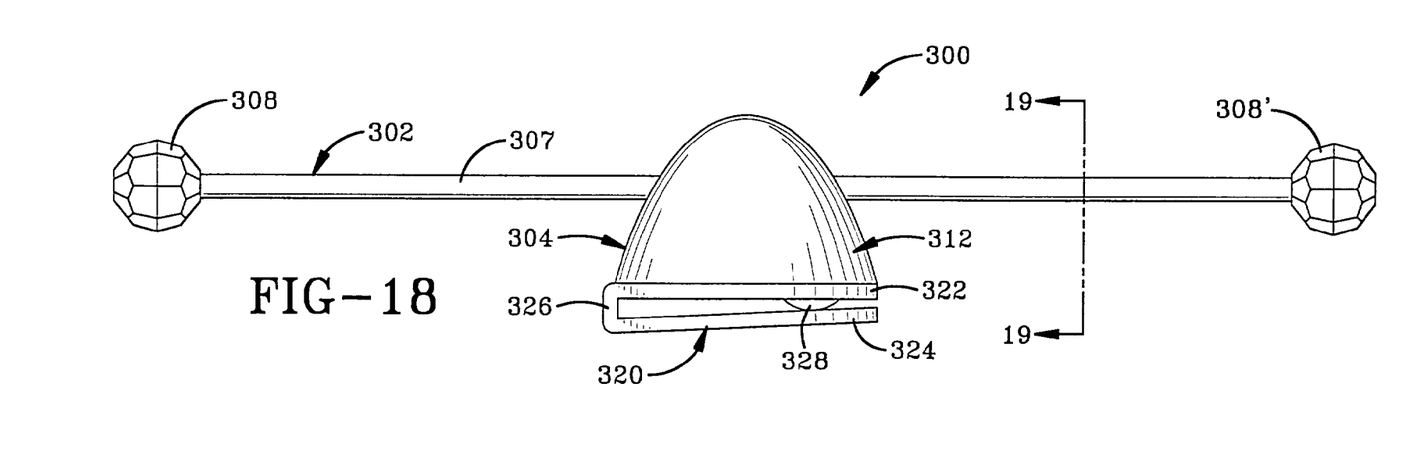
FIG. 18 is an elevation of the indicator of FIG. 17.
Figure 19:
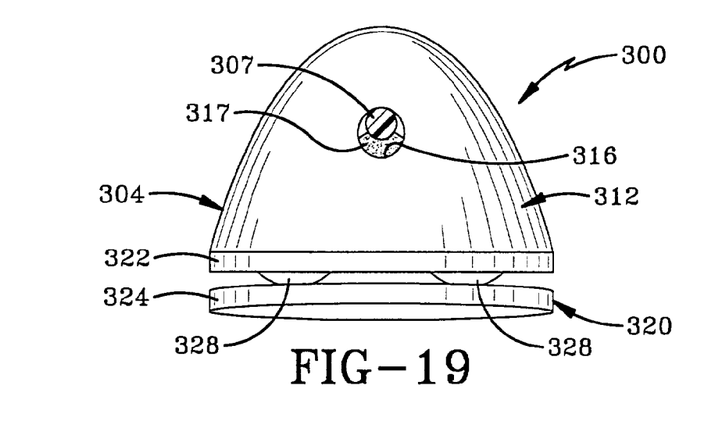
FIG. 19 is a sectional view taken along line 19—19 of FIG. 18.
Figure 20:
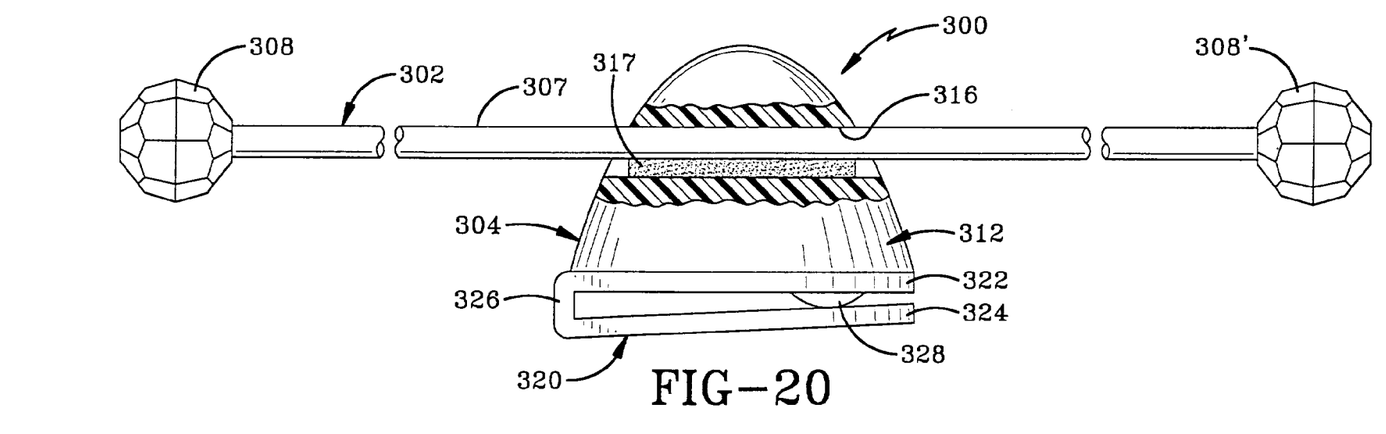
FIG. 20 is a view similar to FIG. 18 with a portion of the housing block in section.
Figure 21:
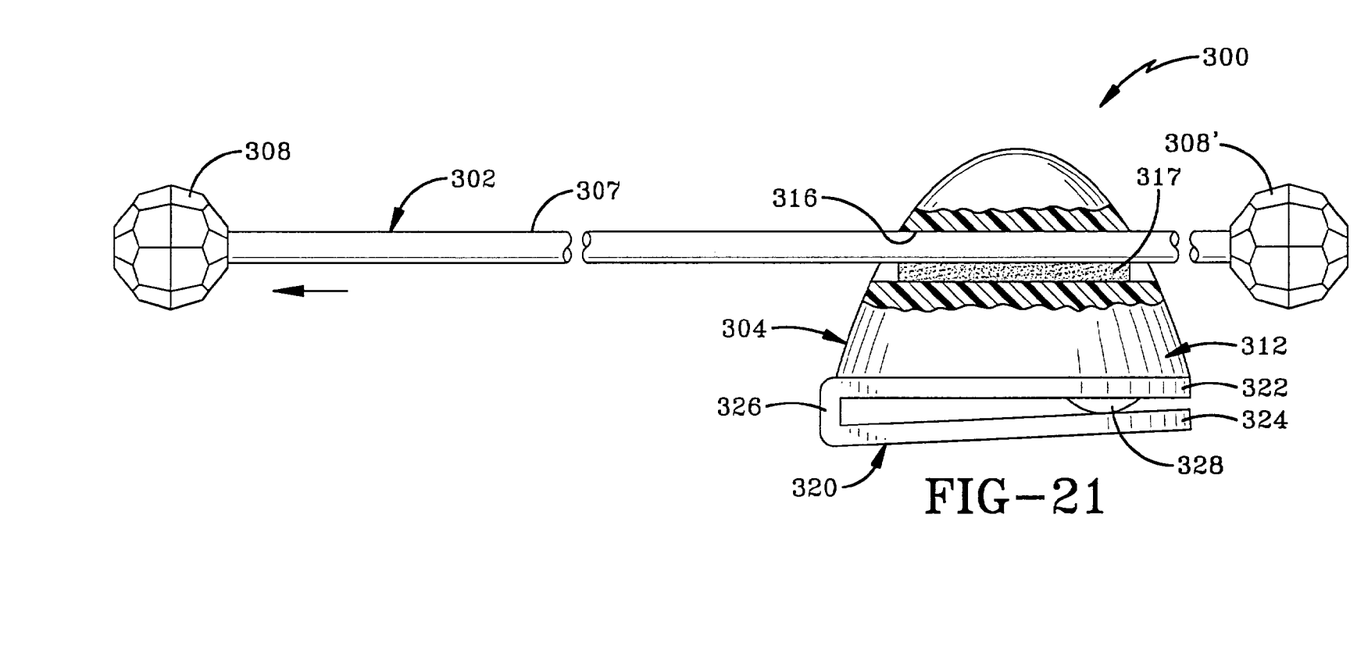
FIG. 21 is a view similar to FIG. 20 showing the position of the indicator assembly being adjusted to an extended position.

A third embodiment of the present invention is indicated generally by numeral 201 in FIGS. 14 through 16. Tailgate position indicator 201 includes an indicator assembly 202 carried by and extending from a housing block 212. Indicator assembly 202 includes an indicator rod 207 having a first end carrying a first indicator body 208 and having a second end carrying a second indicator body 208'. Indicator rod 207 is resilient and may be fabricated from a tightly wound spring of steel, although alternative materials may be used that are resilient.

Housing block 212 defines a first channel 216, a second channel 214, and a third channel 218 with second channel 214 connecting first channel 216 with third channel 218 to form a continuous channel through block 212. A first surface 217 of block 212 defines first channel 216. A second surface 215 of block 212 defines second channel 214. As may be seen in the drawings, second surface 215 connects with the outer surface of block 212 such that a portion of second channel 214 extends entirely through block 212. This opening is slightly larger that the diameter of indicator rod 207. Surface 215 is, however, configured to provide a lip 223 that retains rod 207 in channel 214. A third surface 219 of block 212 defines third channel 218. The combination of all three channels 216, 214, and 218 form a single curved, or U-shaped, continuous channel through block 212 with the entrance and exit of the channel being disposed on the same side of block 212.

An adhesive layer 226 is disposed on a flat surface of block 212 that is substantially parallel to a plane formed by the centerlines of each channel 216, 214, and 218. Adhesive 226 is adapted to attach indicator 201 to the outer surface of a tailgate 10 without damaging the finish of tailgate 10.

When in use, indicator rod 207 passes through first channel 216, second channel 214, and thereafter through third channel 218. In this position, indicator rod 207 is frictionally held in block 212 due to the natural resilience of indicator rod 207 which, when in its bent condition, is urged against surfaces 217, 215, and 219.

Indicator rod 207 is adjusted with relation to block 212 by pushing either the first or second end of indicator rod 207 further into block 212 causing indicator rod 207 to pop out of contact with second surface 215 and extend through the opening of second channel 214 to the exterior of block 212.

In such position, indicator rod 207 is no longer frictionally held against second surface 215 and the position of indicator rod 207 may be adjusted with respect to block 212.

In any of the embodiments of the invention described above, indicator rod 7, 107, or 207 may be constructed of a tough, resilient, light-transmitting material capable of gathering and transmitting light produced by truck tail lamp 54 so that indicator rod 7, 107, or 207 can be easily observed by the driver of the truck in dark conditions. Such a material may be a fiberoptic material or a substantially clear plastic having light transmission properties.

A fourth embodiment of the present invention is indicated generally by the numeral 300 in FIGS. 17–21. Tailgate position indicator 300 includes an indicator assembly 302 carried by and extending from a housing block 312. Indicator assembly 302 includes an indicator rod 307 having a first end carrying a first indicator body 308 and having a second end carrying a second indicator body 308'. Indicator rod 307 is preferably fabricated from a light-transmitting material and is in the form of an elongated rod having a substantially circular cross-section. Indicator rod 307 may be substantially rigid but may also be fabricated to flex so that it will not break if accidentally hit against another object. In other embodiments of the invention, indicator rod 307 may be fabricated from an opaque plastic or a metal.

Each indicator body 308 and 308' preferably includes a plurality of substantially planar faces that cooperate together to form a substantially round surface. The faces of indicator bodies 308 and 308' are configured to reflect light at a plurality of viewing angles so that they are more easily seen by the person sitting in the cab of the truck using indicator 300. In the preferred embodiment, each indicator body 308 and 308' is substantially transparent.

Housing block 312 defines a first channel 316 that extends through block 312 in a substantially linear fashion. Indicator rod 307 is slidably disposed in first channel 316 allowing the relative positions of indicator bodies 308 and 308' to be adjusted with respect to housing block 312. A friction body 317 is disposed against indicator rod 307 to create a frictional force between housing block 312 and indicator rod 307. The frictional force between friction body 317 and indicator rod 307 is sufficient to lock the position of rod 307 in place with respect to housing block 312 until intentionally moved by the user of device 300. In the preferred embodiment of the invention, friction body 317 is disposed in first channel 316. In other embodiments, friction body 317 may be disposed on the outside of housing block 312. In still another embodiment, friction body 317 may be incorporated into rod 307 either by increasing the diameter of rod 307 or by adding a separate layer to rod 307. In the preferred embodiment of the invention, friction body 317 is fabricated from a felt material. In other embodiments, friction body 317 may be fabricated from any appropriate material such as a foam, a cloth, a piece of wood, a piece of plastic, a piece of metal, sufficient to create a frictional force against rod 307. Friction body 317 is held in place in channel 316 by appropriate connectors depending on the material from which friction body 317 is fabricated. In the preferred embodiment where friction body 317 is fabricated from felt, a glue may hold friction body 317 to housing block 312.

Indicator assembly 300 includes a housing assembly 304 that includes housing block 312 and a connector 320. Connector 320 is in the form of a resilient clip having an upper jaw 322 connected to a lower jaw 324 by a resilient hinge 326. Jaws 322 and 324 as well as hinge 326 are configured to have a resting position wherein lower jaw 324 engages a protrusion 328 extending downwardly from upper jaw 322. In other embodiments of the invention, lower jaw 324 may directly contact upper jaw 322. Connector 320 is configured to allow device 300 to be connected to essentially any thin piece of material on the tailgate of a truck such as the edge of a piece of sheet metal. In other embodiments of the invention, connector 320 may be magnetic, adhesive, a suction device, or other devices known in the art for connecting body 312 to a tailgate.

Figure 22:
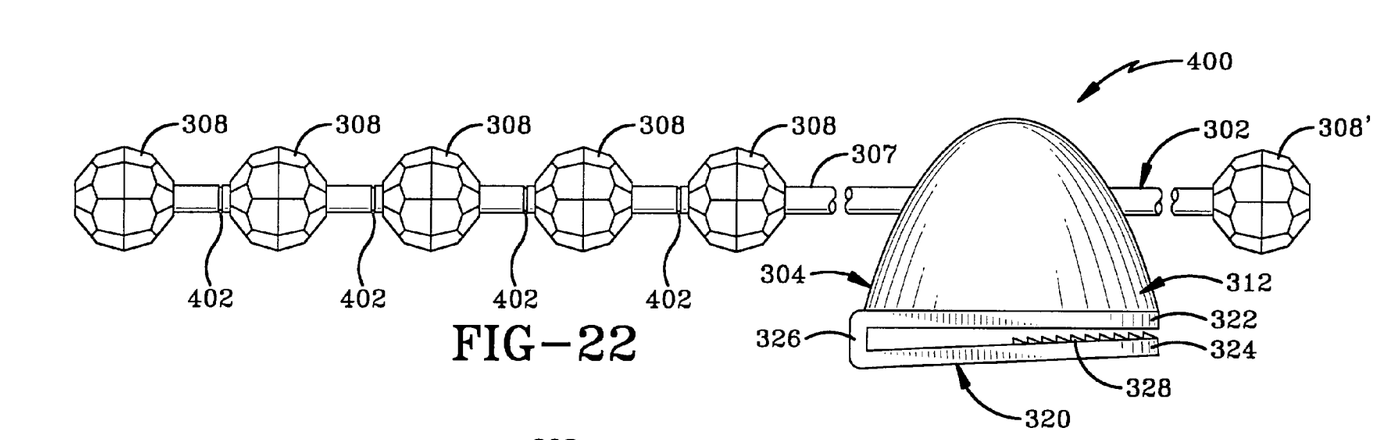
FIG. 22 is an elevation of a fifth embodiment of the tailgate position indicator of the present invention.
Figure 23:
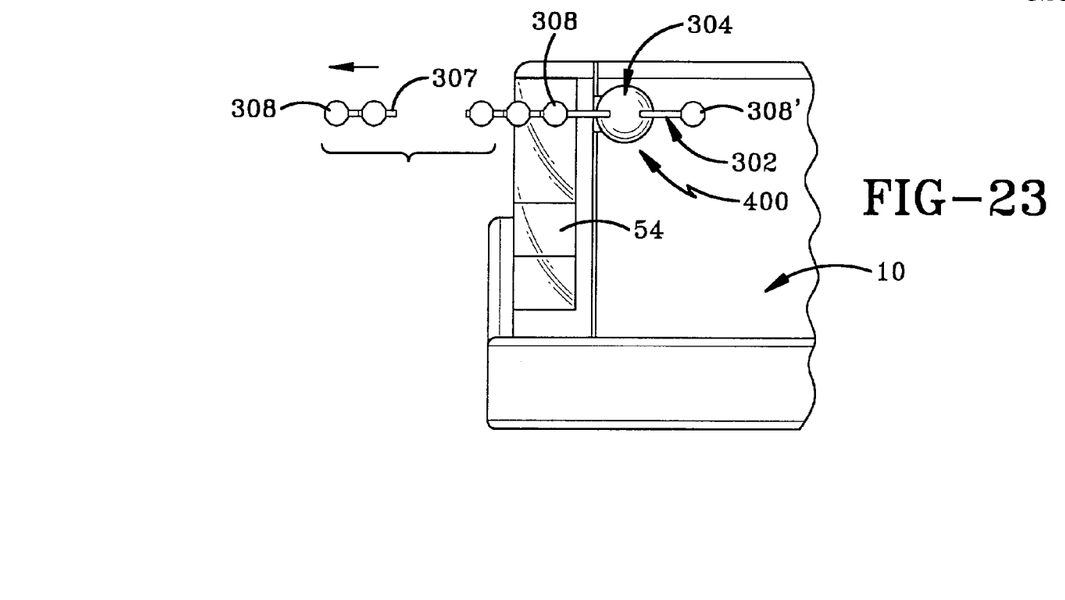
FIG. 23 is a rear elevation view of a truck showing the position of the tailgate position indicator with respect to the tailgate and the lights of the truck with a portion of the tailgate position indicator being removed after being correctly sized.

A fifth embodiment of the present invention is indicated generally by the numeral 400 in FIGS. 22 and 23. Tailgate position indicator 400 generally includes elements similar to the fourth embodiment of the invention discussed above and the same reference numbers are used to refer to these elements. As such, indicator 400 generally includes an indicator assembly 302 that is carried by and extends from a housing block 312. In the fifth embodiment of the invention, indicator assembly 302 includes an indicator rod 307 integrally formed with block 312. A plurality of spaced indicator bodies 308 are carried by indicator rod 307. Indicator body 308' is optional in this embodiment and may not be included when indicator 400 is manufactured. The plurality of spaced indicator bodies 308 allow the overall length of indicator assembly 302 to be adjusted or customized for the specific truck tail lamp 54 after the user clips block 312 to tailgate 10 as shown in FIG. 23. Indicator 400 may be adjusted or customized by removing the extra bodies 308. Typically, the user will only need one body 308 extending beyond lamp 54. The structure of indicator assembly 302 allows tailgate position indicator 400 to be used with a variety of different trucks having different width tailgates 10 and lights 54.

Rod 307 may define a notch 402 disposed adjacent each indicator body 308. Notch 402 allows the user to simply break rod 307 at the desired location as shown in FIG. 23. If the user does not wish to break rod 307 at notches 402, the user may sever rod 307 with an appropriate cutting device such as a knife, clippers, or scissors.

The user installs tailgate position indicator 400 by clipping block 312 to tailgate 10 with connector 320. The user then checks to see how many indicator bodies 308 he can see through his mirror. The user then removes excess indicator bodies 308 as shown in FIG. 23. In this embodiment, the position of indicator rod 307 is fixed with respect to block 312 because they are integrally molded together in a single mold. The only adjustability is achieved by removing excess indicator bodies 308. This embodiment allows provides a customizable indicator 400 to be integrally molded as a one-piece element that requires no assembly after molding.

Accordingly, the improved tailgate position indicator apparatus is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the tailgate position indicator is constructed and used, the characteristics of the construction, and the advantageous new and useful results obtained; the new and useful structures, devices, elements, arrangements, parts, and combinations are set forth in the appended claims.

What is claimed is:

1. In combination:
a vehicle having a tailgate movable between a substantially vertical closed position and a substantially horizontal open position;
the tailgate having a top surface and a pair of side surfaces;
a tailgate position indicator carried by the tailgate and moving with the tailgate between the open and closed positions;
the tailgate position indicator carried by the tailgate in a secure manner that allows the indicator to remain on the tailgate while the vehicle is driven in normal use;
the tailgate position indicator extending substantially horizontally away from one of the sides of the tailgate;
the vehicle including a cab, a bed disposed behind the cab, and a side view mirror;
at least a portion of the tailgate position indicator being visible from the cab when the tailgate is in the open position and the closed position whereby a driver in the cab of the vehicle can see at least a portion of the tailgate position indicator in the side view mirror when the bed of the vehicle is loaded or covered to block the driver's view of the tailgate; and
the tailgate position indicator including an indicator rod and a plurality of spaced indicator bodies carried by the indicator rod; each of the indicator bodies having a thickness larger than the thickness of the rod.

2. The combination of claim 1, wherein the tailgate position indicator includes a resilient clip that attaches the tailgate position indicator to the tailgate.

3. The combination of claim 2, wherein the indicator rod is integrally fabricated with the resilient clip.

4. The combination of claim 3, wherein the indicator bodies are integrally fabricated with the indicator rod.

5. The combination of claim 1, wherein the indicator rod defines a notch adjacent at last one of the indicator bodies; the notch being adapted to assist the user in severing the indicator rod to adjust the length of the rod.

6. The combination of claim 1, wherein at least two spaced indicator bodies are carried by the indicator rod.

7. The combination of claim 6, wherein at least three spaced indicator bodies are carried by the indicator rod.

8. The combination of claim 7, wherein at least four spaced indicator bodies are carried by the indicator rod.

9. A tailgate position indicator for use with a vehicle having a tailgate movable between a substantially vertical closed position and a substantially horizontal open position; the tailgate having a top surface and a pair of side surfaces; the vehicle including a cab, a bed disposed behind the cab, and a side view mirror; the tailgate position indicator comprising:
a customizable indicator rod adapted to be carried by the tailgate and moving with the tailgate between the open and closed positions in a secure manner that allows the indicator to remain on the tailgate while the vehicle is driven in normal use;
the indicator rod adapted to extend substantially horizontally away from one of the sides of the tailgate;
a plurality of spaced indicator bodies carried by the indicator rod; and
the indicator rod defining a notch adjacent at last one of the indicator bodies; the notch being adapted to assist the user in customizing the indicator rod by severing the indicator rod to adjust the length of the rod.

10. The combination of claim 9, wherein the tailgate position indicator includes a resilient clip that attaches the tailgate position indicator to the tailgate.

11. The combination of claim 9, wherein at least three spaced indicator bodies are carried by the indicator rod.

* * * * *